US012707322B2

(12) United States Patent
Fujishiro

(10) Patent No.: US 12,707,322 B2
(45) Date of Patent: Aug. 11, 2026

(54) COMMUNICATION CONTROL METHOD AND RELAY NODE

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 301 days.

(21) Appl. No.: 18/638,445

(22) Filed: Apr. 17, 2024

(65) Prior Publication Data

US 2024/0267780 A1 Aug. 8, 2024

Related U.S. Application Data

(63) Continuation of application No. PCT/JP2022/038723, filed on Oct. 18, 2022.

(30) Foreign Application Priority Data

Oct. 20, 2021 (JP) ................................ 2021-171781

(51) Int. Cl.
*H04W 88/08* (2009.01)
*H04W 28/02* (2009.01)

(52) U.S. Cl.
CPC ... *H04W 28/0273* (2013.01); *H04W 28/0278* (2013.01); *H04W 88/08* (2013.01)

(58) Field of Classification Search
CPC ......... H04W 28/0273; H04W 28/0278; H04W 88/08
USPC .......................................................... 370/229
See application file for complete search history.

(56) References Cited

U.S. PATENT DOCUMENTS

2021/0184994 A1* 6/2021 Wang .................... H04L 1/1896
2023/0044810 A1 2/2023 Zhuo et al.

FOREIGN PATENT DOCUMENTS

WO 2021/204278 A1 10/2021

OTHER PUBLICATIONS

3rd Generation Partnership Project; Technical Specification Group Radio Access Network; NR; NR and NG-RAN Overall Description; Stage 2 (Release 16); 3GPP TS 38.300 V16.7.0; Sep. 2021; pp. 1-152.
ETRI; "Discussion on local rerouting based on HbH flow control indication"; 3GPP TSG-RAN WG2 Meeting #114 electronic; R2-2106303; Online meeting; May 19-27, 2021; pp. 1-3.
Fujitsu, "Open issues on (re-)routing", 3GPP TSG-RAN WG2 Meeting #115-e, R2-2107648, Online, Aug. 16-27, 2021, total 9 pages.
Fujitsu, "Discussion on local rerouting", 3GPP TSG-RAN WG2 Meeting #114-e, R2-2105398, Online, May 19-27, 2021, total 7 pages.

* cited by examiner

*Primary Examiner* — Christopher R Crompton
(74) *Attorney, Agent, or Firm* — Studebaker Brackett PLLC

(57) ABSTRACT

In a first aspect, a communication control method is used in a cellular communication system. The communication control method includes: transmitting, by a donor node to a relay node, an F1AP message for configuring a buffer size threshold value; receiving, by the relay node, flow control feedback; triggering, by the relay node, local rerouting when an available buffer size included in the DL flow control feedback is equal to or less than the buffer size threshold value; and transmitting, by the relay node, data to another relay node on an alternative path.

5 Claims, 11 Drawing Sheets

COMMUNICATION CONTROL METHOD AND RELAY NODE

RELATED APPLICATIONS

The present application is a continuation based on PCT Application No. PCT/JP2022/038723, filed on Oct. 18, 2022, which claims the benefit of Japanese Patent Application No. 2021-171781 filed on Oct. 20, 2021. The content of which is incorporated by reference herein in their entirety.

TECHNICAL FIELD

The present disclosure relates to a communication control method used in a cellular communication system.

BACKGROUND OF INVENTION

The Third Generation Partnership Project (3GPP), which is a standardization project of a cellular communication system, has studied the introduction of a new relay node referred to as an Integrated Access and Backhaul (IAB) node. One or more relay nodes are involved in communication between a base station and a user equipment and perform relay for the communication.

CITATION LIST

Non-Patent Literature

Non-Patent Document 1: 3GPP TS 38.300 V16.7.0 (2021 September)

SUMMARY

In a first aspect, a communication control method is used in a cellular communication system. The communication control method includes: transmitting, by a donor node to a relay node, an F1AP message for configuring a buffer size threshold value; receiving, by the relay node, flow control feedback; triggering, by the relay node, local rerouting when an available buffer size included in a DL flow control feedback is equal to or less than the buffer size threshold value; and transmitting, by the relay node, data to another relay node on an alternative path.

In a second aspect, a relay node is used in a cellular communication system. The relay node includes a processor. The processor executes processing of: receiving, from a donor node, an F1AP message for configuring a buffer size threshold value; receiving flow control feedback; triggering local rerouting when an available buffer size included in a DL flow control feedback is equal to or less than the buffer size threshold value; and transmitting data to another relay node on an alternative path.

DESCRIPTION OF EMBODIMENTS

A cellular communication system in an embodiment is described with reference to the drawings. In the description of the drawings, the same or similar parts are denoted by the same or similar reference signs.

Configuration of Cellular Communication System

A configuration example of the cellular communication system according to an embodiment is described. In an embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system 1. A future cellular communication system such as 6G may be applied to the cellular communication system 1.

Figure 1:
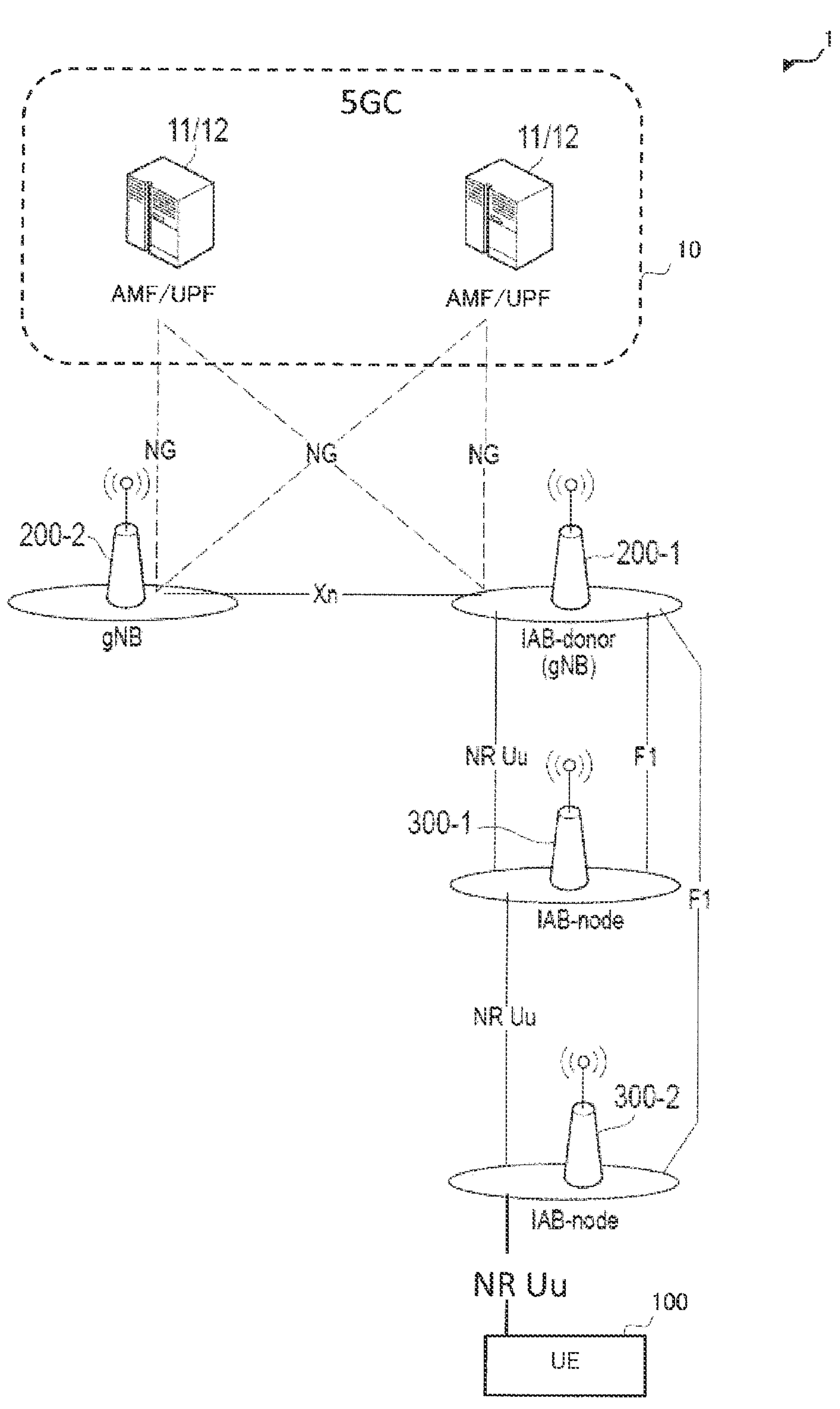
FIG. 1 is a diagram illustrating a configuration example of a cellular communication system according to an embodiment.

FIG. 1 is a diagram illustrating a configuration example of the cellular communication system 1 according to the embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency. Hereinafter, the cell and the base station may be used without distinction.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB 200-1 (or a donor node, which hereinafter may be also referred to as a "donor node") is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 includes a mobile phone terminal, a tablet terminal, a laptop PC, a sensor or an apparatus that is provided in a sensor, a vehicle or an apparatus that is provided in a vehicle, and an aircraft or an apparatus provided in an aircraft. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
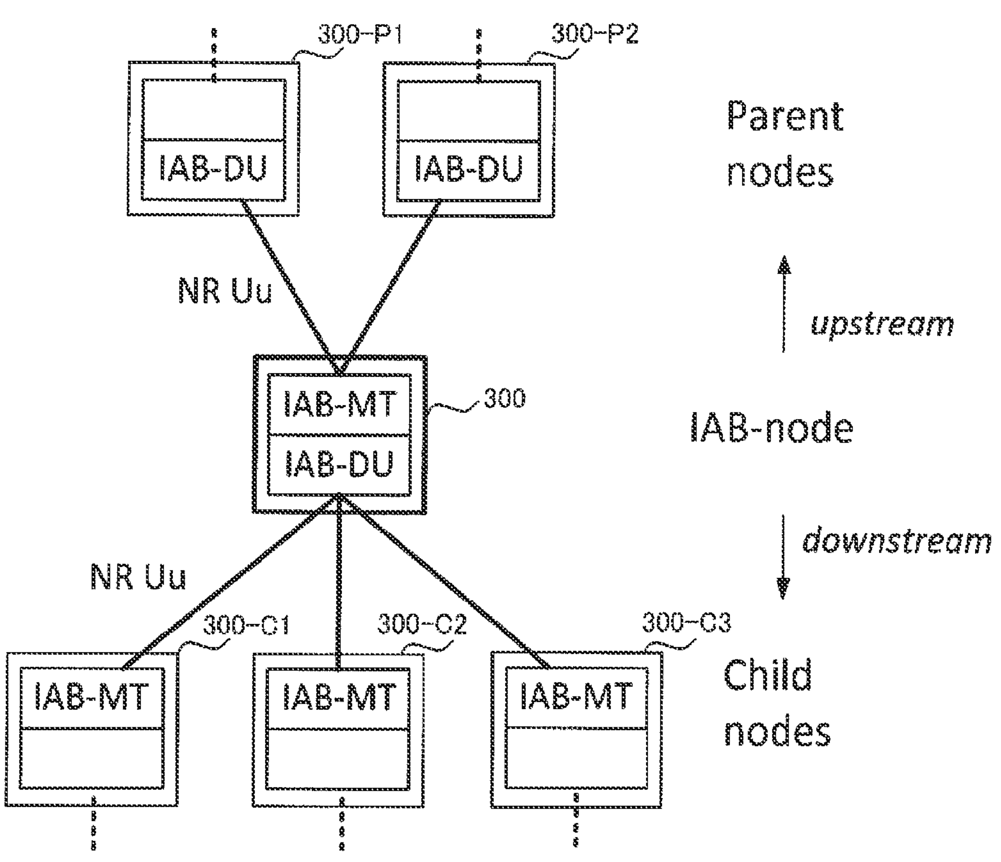
FIG. 2 is a diagram illustrating a relationship between an IAB node, parent nodes, and child nodes.

FIG. 2 is a diagram illustrating an example of a relationship between the IAB node 300, parent nodes, and child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides network access to the UE 100 via a network of backhaul links and access links.

Configuration of Base Station

Figure 3:
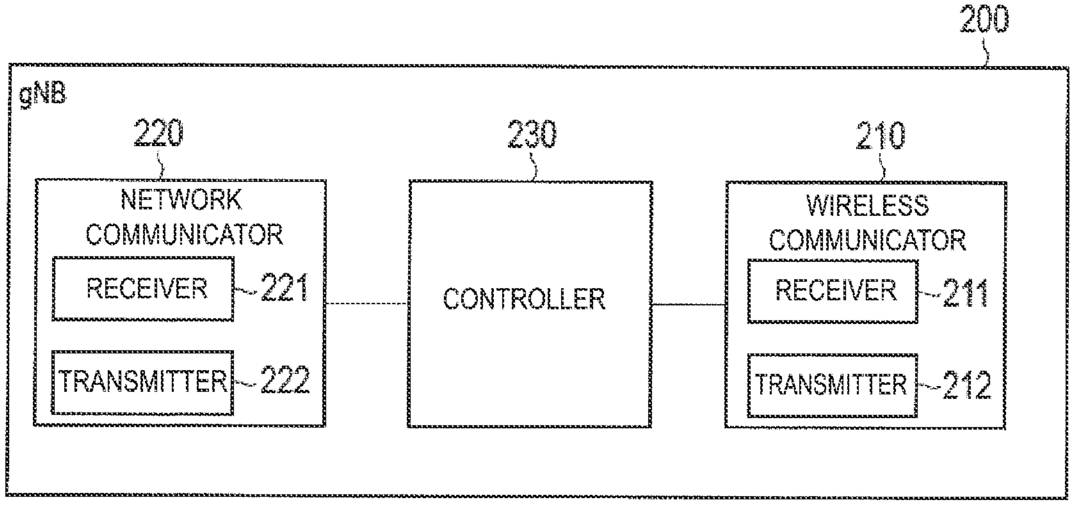
FIG. 3 is a diagram illustrating a configuration example of a gNB (base station) according to the embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then output to the controller 230. The transmitter 212 performs various types of transmission under control of the controller 230. The transmitter 212 includes an antenna and converts (up-converts) a baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 230 may perform each processing or each operation in the gNB 200 in each embodiment described below.

Configuration of Relay Node

Figure 4:
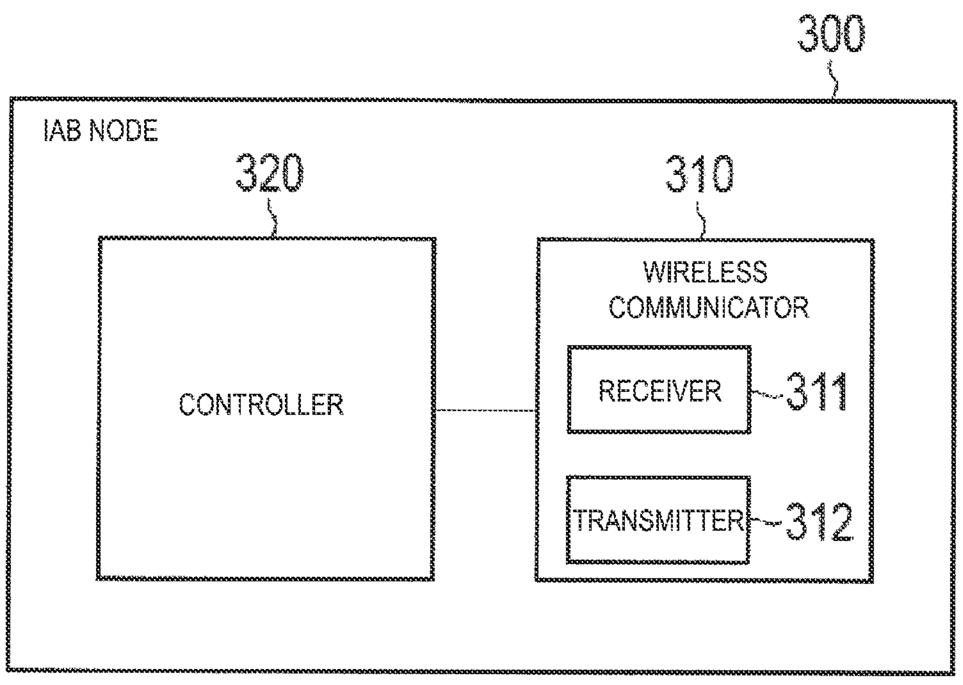
FIG. 4 is a diagram illustrating a configuration example of an IAB node (relay node) according to the embodiment.

A configuration of the IAB node 300 that is a relay node (or a relay node apparatus, which may be also referred to as a "relay node" below) according to the embodiment will be described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then output to the controller 320. The transmitter 312 performs various types of transmission under control of the controller 320. The transmitter 312 includes an antenna and converts (up-converts) a baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 320 may perform each processing or each operation in the IAB node 300 in each embodiment described below.

Configuration of User Equipment

Figure 5:
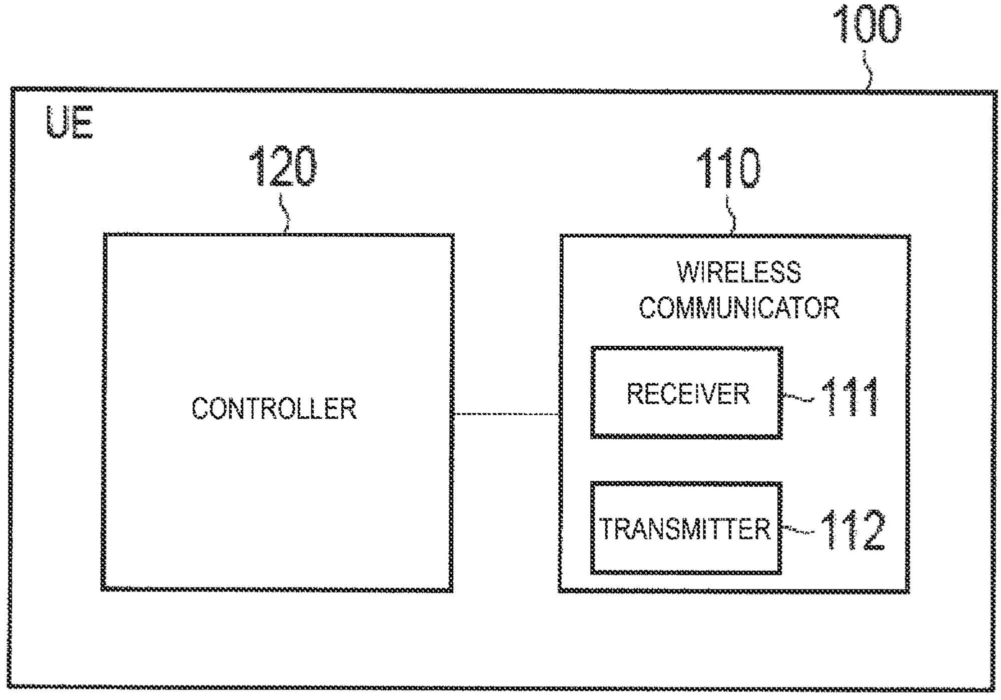
FIG. 5 is a diagram illustrating a configuration example of a UE (user equipment) according to the embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 120 may perform each processing in the UE 100 in each embodiment described below.

Configuration of Protocol Stack

Figure 6:
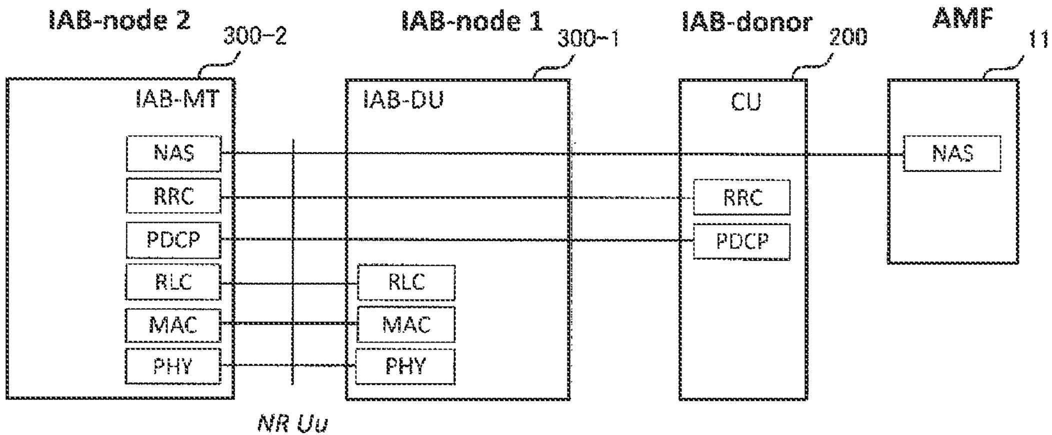
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines uplink and the downlink transport formats (transport block sizes, Modulation and Coding Schemes (MCSs)) and resource blocks.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor node 200 via a radio bearer.

The RRC layer controls a logical channel, a transport channel, and a physical channel according to establishment, re-establishment, and release of a radio bearer. RRC signaling for various configurations is transmitted between the RRC layer of the IAB-MT of the IAB node 300-2 and the RRC layer of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned upper than the RRC layer performs session management, mobility management, and the like. NAS signaling is transmitted between the NAS layer of the IAB-MT of the IAB node 300-2 and the AMF 11.

Figure 7:
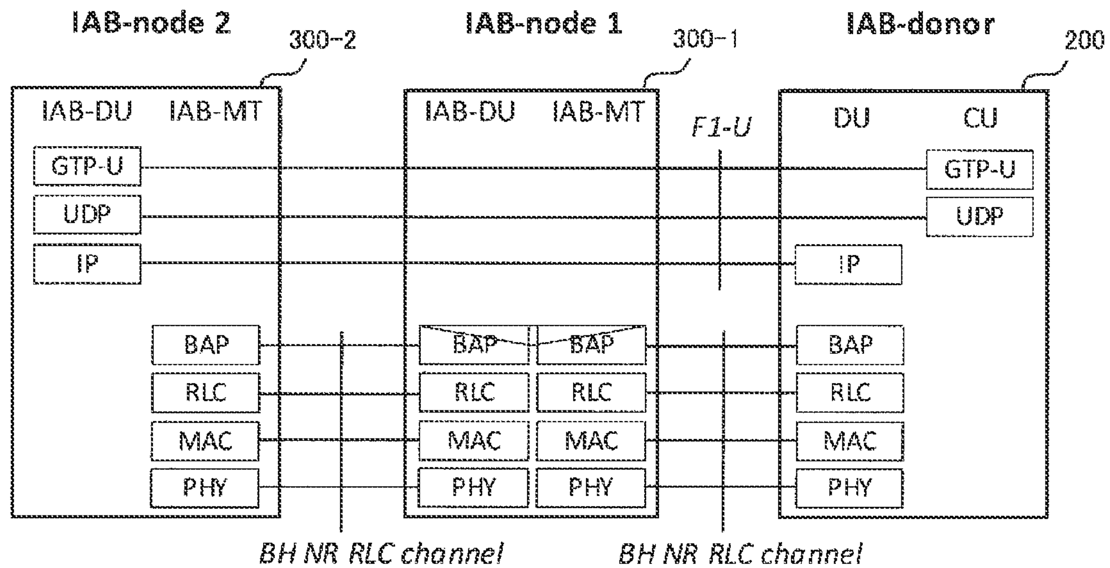
FIG. 7 is a diagram illustrating an example of a protocol stack related to an F1-U protocol.
Figure 8:
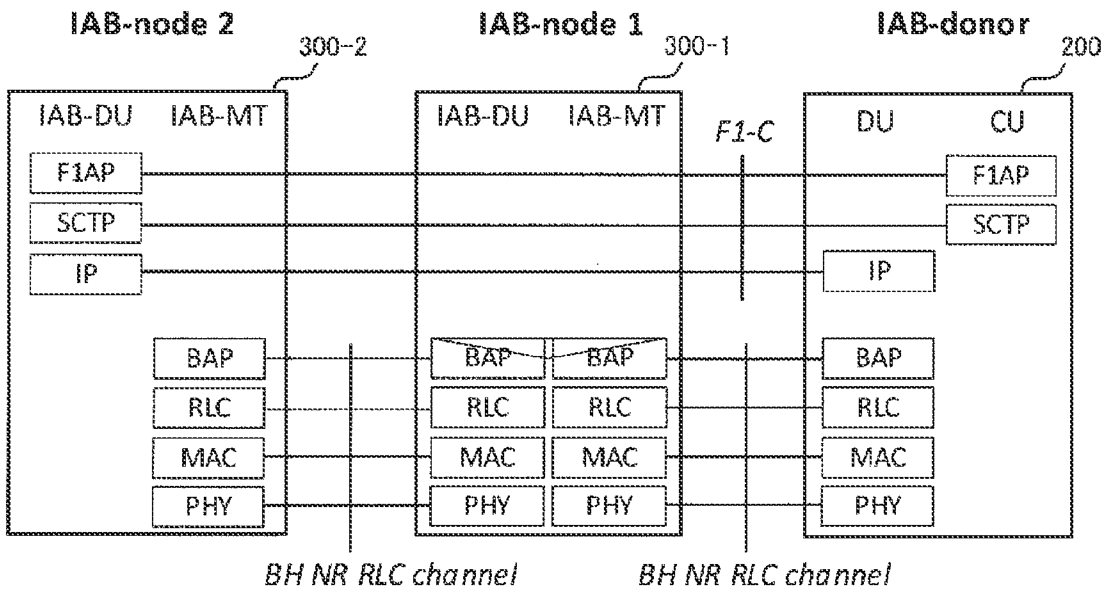
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is executed by the BAP layer of each IAB node 300 and the BAP layer of the donor node 200.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment will be described.

Flow Control

Flow control may be performed between the IAB nodes 300 or between the IAB node 300 and the donor node 200. The flow control allows, for example, congestion-related packet loss not to occur. Note that the flow control may be referred to as hop-by-hop flow control.

Figure 9A:
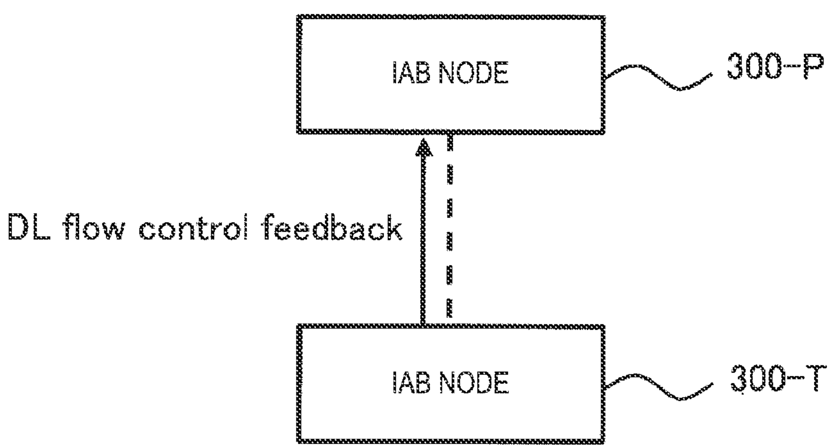
FIG. 9A and FIG. 9B are diagrams illustrating examples of flow control feedback according to a first embodiment.
Figure 9B:
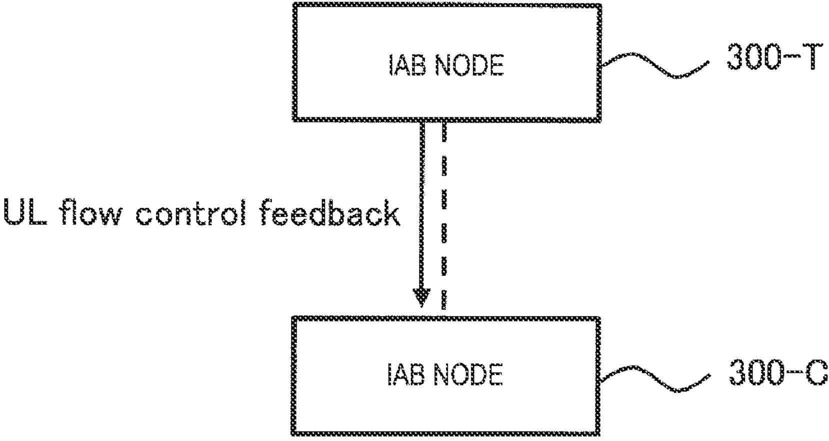

FIG. 9A and FIG. 9B are diagrams illustrating examples of flow control feedback according to the first embodiment.

The flow control feedback includes flow control feedback in the downstream direction and flow control feedback in the upstream direction.

Here, the flow control feedback in the downstream direction may be referred to as DL flow control feedback. The flow control feedback in the upstream direction may be referred to as UL flow control feedback.

The flow control in the downstream direction (DL flow control) is supported in the BAP layer of the IAB node 300. The (BAP entity of the) IAB-MT of the IAB node 300-T triggers flow control feedback when buffer loads exceed a certain level. Alternatively, the IAB-MT of the IAB node 300-T triggers flow control feedback upon receiving flow control polling from the parent node 300-P of the IAB node 300-T.

When triggering the flow control feedback, the IAB-MT of the IAB node 300-T generates DL flow control feedback including an available buffer size and the like. As illustrated in FIG. 9A, the IAB-MT of the IAB node 300-T transmits the generated DL flow control feedback to the parent node 300-P. The DL flow control feedback is transmitted using a BAP Control PDU.

In response to receiving the DL flow control feedback, the parent node 300-P can, for example, reduce the amount of data transmitted to the IAB node 300-T (in the downstream direction) or refrain from the transmission itself.

This allows buffer overflow in the IAB node 300-T to be suppressed. The buffer overflow is a phenomenon in which the data received from the parent node 300-P fails to be transferred (transmitted) to the child node in the IAB node 300-T, and remains held in the buffer (memory) of the IAB node 300-T, causing the data for accumulation to exceed the buffer size eventually. The parent node 300-P reduces the amount of data transmitted to the IAB node 300-T or refrains from the transmission itself, thus enabling such buffer overflow to be suppressed. Congestion between the parent node 300-P and the IAB node 300-T can be suppressed.

Note that the 3GPP has specified the DL flow control feedback.

The flow control also includes flow control in the uplink direction (UL flow control). As illustrated in FIG. 9B, the IAB node 300-T performs the flow control in the uplink direction by transmitting UL flow control feedback to the child node 300-C of the IAB node 300-T.

In this case, in response to receiving the UL flow control feedback, the child node 300-C can reduce the amount of data or control signals (in the upstream direction) transmitted to the IAB node 300-T or refrain from the transmission itself.

Note that the 3GPP has studied specification of the UL flow control feedback.

Flow Control Feedback and Local Rerouting

The 3GPP has partly agreed on local rerouting using DL flow control feedback.

On the other hand, as described above, the 3GPP has studied introduction of UL flow control feedback. Specifically, the 3GPP has studied use of the UL flow control feedback to trigger local rerouting.

Note that the local rerouting is, for example, to perform control so as to forward a received packet to a destination node (access IAB node or donor node) via an alternative path. As a result, for example, even when a radio link failure (BH RLF) occurs in the backhaul link between the IAB node 300-1 and its parent node 300-P1, the IAB node 300-1 can switch a path to an alternative path and transmit a packet in the upstream direction to the parent node 300-P2 on the alternative path.

Communication Control Method According to First Embodiment

In the first embodiment, UL flow control feedback will be mainly described.

Regarding a problem when congestion occurs in the upstream direction, example scenarios are as follows.

S1: Congestion occurs in the backhaul link between the parent node 300-P and an upper IAB node, and the amount of transmission of the parent node 300-P in the uplink stream direction becomes smaller than before the congestion.

S2: In the parent node 300-P, the remaining buffer amount becomes smaller than before the congestion.

S3: The parent node 300-P decreases the amount of UL grant (the number of times of transmission of the UL grant, the amount of resources allocated by the UL grant, and/or the like) to the IAB node 300-T, which is a child node, as compared with before the congestion.

S4: The amount of transmission of the IAB node 300-T in the upstream direction becomes smaller than before the congestion.

S5: The remaining buffer amount of the IAB node 300-T becomes smaller than before the congestion.

When the congestion occurs in the backhaul link of the parent node 300-P in this manner (S1), the remaining buffer amount of the IAB node 300-T becomes smaller than before the congestion (S5).

Thus, in the first embodiment, the IAB node 300-T determines whether to perform local rerouting based on the buffer amount of the buffer that stores data waiting to be transmitted.

Specifically, the relay node (e.g., the IAB node 300-T) first stores, in the buffer, the data waiting to be transmitted to the parent node (e.g., the parent node 300-P1) among data received from the child node (e.g., the child node 300-C) of the relay node. Secondly, the relay node triggers the local rerouting when the buffer amount of the buffer is equal to or greater than a first buffer threshold value or triggers the local rerouting when the remaining buffer amount of the buffer is equal to or less than a second buffer threshold value. Thirdly, the relay node transmits the data waiting to be transmitted to another relay node on an alternative path. Here, each of the first buffer threshold value and the second buffer threshold value is at least one selected from the group consisting of a buffer threshold value for each routing ID, a buffer threshold value for each egress backhaul link, and a buffer threshold value for each egress backhaul RLC channel.

As a result, for example, the IAB node 300-T can transmit, to another parent node 300-P2, the data waiting to be transmitted when the buffer amount is equal to or greater than the first buffer threshold value. Thus, in the IAB node 300-T, buffer overflow for data in the upstream direction is suppressed, and packet loss, service delay, or the like can also be suppressed. At this time, each of the first buffer threshold value and the second buffer threshold value is at least one selected from the group consisting of a buffer threshold value for each routing ID, a threshold value for each egress backhaul link, and a threshold value for each egress backhaul RLC channel. Thus, in the IAB node 300-T, for example, packet loss or service delay can be suppressed for each routing ID.

Operation Example According to First Embodiment

An operation example in the first embodiment will be described.

Figure 10:
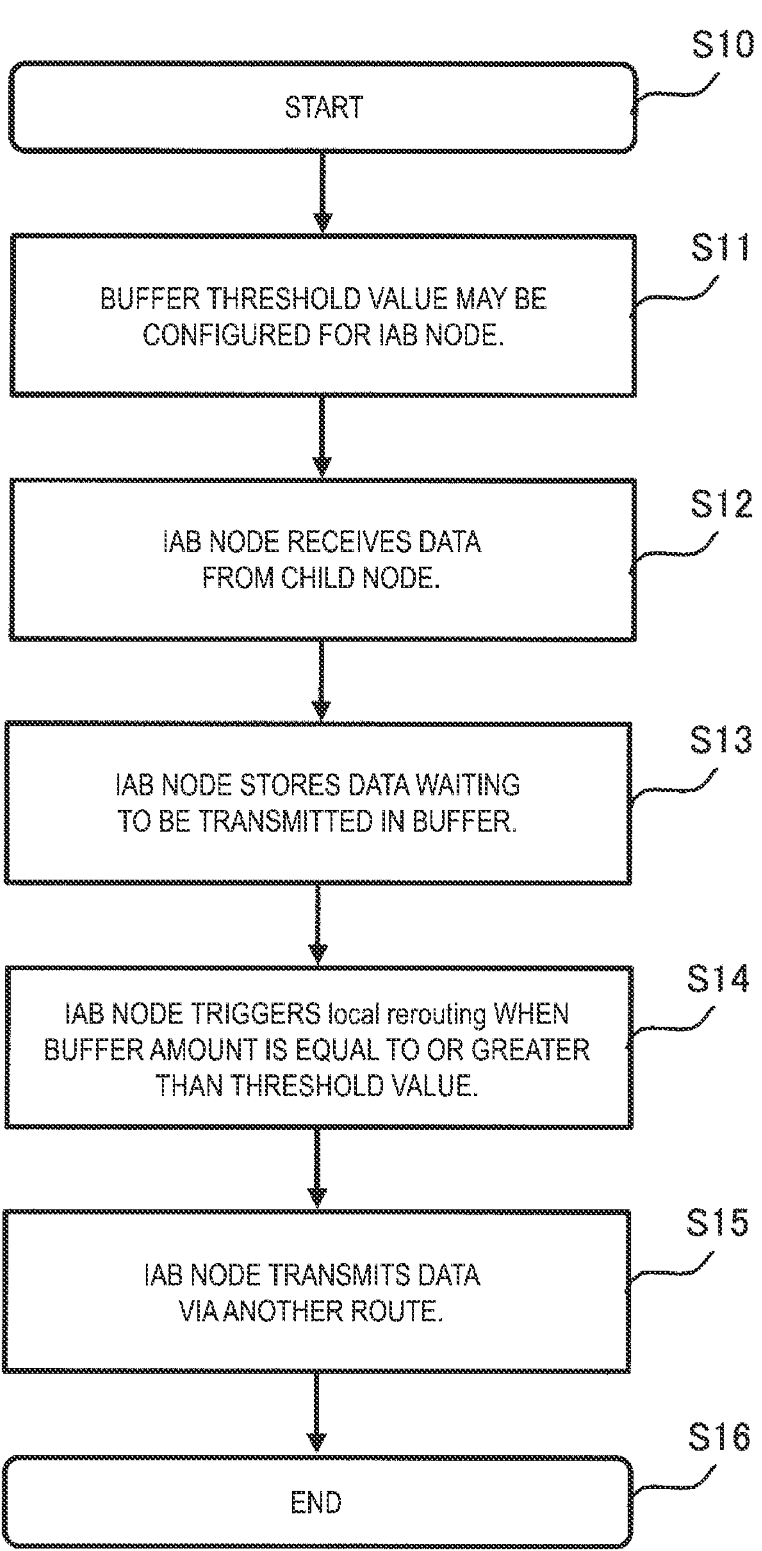
FIG. 10 is a flowchart illustrating an operation example according to the first embodiment.
Figure 11:
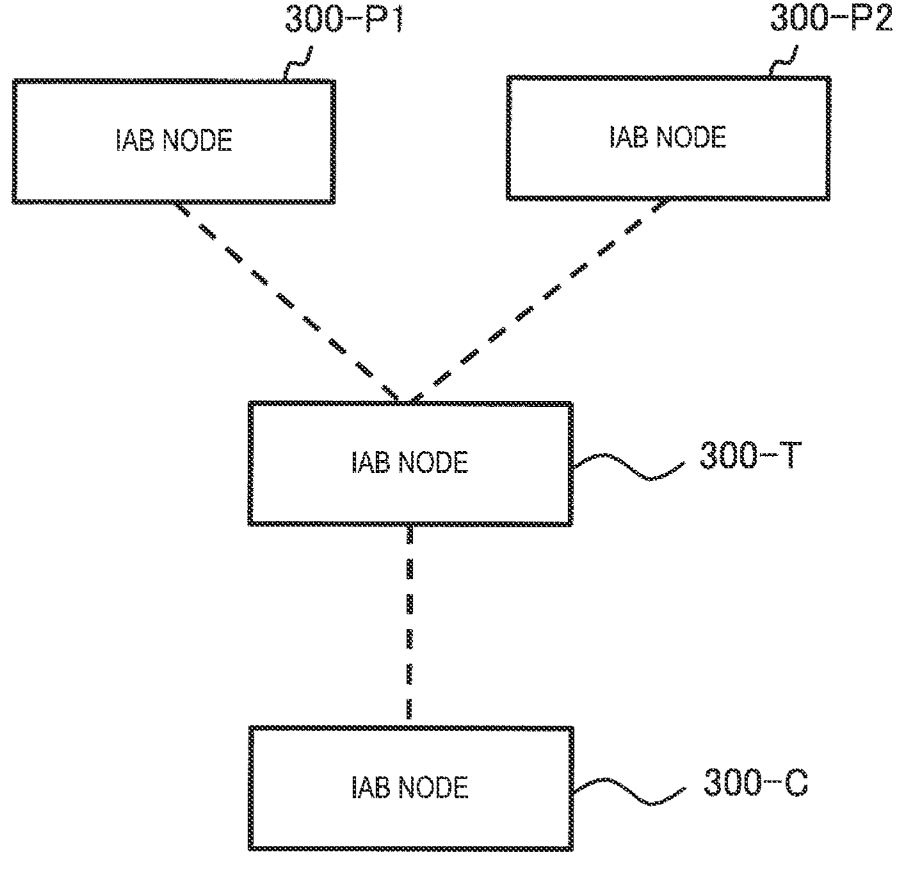
FIG. 11 is a diagram illustrating a configuration example between IAB nodes according to the first embodiment.

FIG. 10 is a flowchart illustrating an operation example according to the first embodiment. FIG. 11 is a diagram illustrating a configuration example between the IAB nodes according to the first embodiment. FIG. 10 will be described with reference to FIG. 11 as appropriate.

As illustrated in FIG. 10, in Step S10, the IAB node 300-T starts processing.

In Step S11, the donor node 200 may configure a buffer threshold value in the IAB node 300-T. For example, the IAB node 300-T may receive an F1AP message or an RRC message including the buffer threshold value from the donor node 200 and thus the remaining buffer amount threshold value may be configured in the IAB node 300-T. Note that the IAB node 300-T may determine the buffer threshold value by itself.

Here, the buffer threshold value includes a first buffer threshold value and a second buffer threshold value.

The first buffer threshold value is a buffer threshold value used for triggering local rerouting when the buffer amount is equal to or greater than the buffer threshold value. The first buffer threshold value is a buffer threshold value that focuses on the amount of data stored in the buffer.

The second buffer threshold value is a buffer threshold value used for triggering local rerouting when the remaining buffer amount (available buffer size) is equal to or less than the buffer threshold value. The second buffer threshold value is a buffer threshold value that focuses on the amount of data that can be stored in the buffer (or the free space of the buffer).

The first buffer threshold value and the second buffer threshold value may be configured (or determined) for each routing ID. The first buffer threshold value and the second buffer threshold value may be configured (or determined) for each egress backhaul link (egress BH link). The first buffer threshold value and the second buffer threshold value may be configured (or determined) for each egress backhaul RLC channel (BH RLC channel). These values used as the first buffer threshold value may all be common or may be different values. These values used as the second buffer threshold value may all be common or may be different values. The first buffer threshold value and the second buffer threshold value may be the same value or may be different values. Each of the first buffer threshold value and the second buffer threshold value may be at least one selected from the group consisting of a threshold value for each routing ID, a threshold value for each egress backhaul link, and a threshold value for each egress backhaul RLC channel. Different indexes may be used for the first buffer threshold value and the second buffer threshold value. For example, the first buffer threshold value may be a buffer threshold value configured for each routing ID, and the second buffer threshold value may be a buffer threshold value configured for each egress backhaul. One of the first buffer threshold value and the second buffer threshold value may be configured (or used), or both may be configured (or used).

In Step S12, the IAB node 300-T receives data from the child node. For example, as illustrated in FIG. 11, the IAB node 300-T receives data from the child node 300-C of the IAB node 300-T. It is assumed that data transmitted in the IAB node 300-T to its parent node 300-P1 decreases as compared with before.

Returning to FIG. 10, in Step S13, the IAB node 300-T stores data waiting to be transmitted in the buffer. For example, in FIG. 11, when the amount of UL grant from the parent node 300-P1 becomes smaller than before in the IAB node 300-T, although data to be transmitted to the parent node 300-P is present, data waiting to be transmitted is generated (or increases). The IAB node 300-T stores such data waiting to be transmitted in the buffer.

Returning to FIG. 10, in Step S14, the IAB node 300-T triggers local rerouting when the buffer amount of the buffer is equal to or greater than the first buffer threshold value. Alternatively, the IAB node 300-T may trigger the local rerouting when the remaining buffer amount of the buffer is equal to or less than the second buffer threshold value. For example, the IAB node 300-T may determine to perform the local rerouting of data corresponding to a routing ID #1 when the buffer amount of the routing ID #1 is equal to or greater than the first buffer threshold value.

In Step S15, when the local rerouting is possible, the IAB node 300-T transmits the data waiting to be transmitted to another IAB node on an alternative path. For example, in the example of FIG. 11, when the local rerouting from the IAB node 300-T to the parent node 300-P2 on the alternative path is possible, the IAB node 300-T transmits the data waiting to be transmitted to the parent node 300-P2.

Returning to FIG. 10, in Step S16, the IAB node 300-T terminates a series of processing operations.

Variation of First Embodiment

In the first embodiment, the processing of triggering the local rerouting based on the first buffer threshold value and/or the second buffer threshold value has been described. The IAB node 300-T may perform processing of stopping the local rerouting using these threshold values. That is, when the buffer amount of the buffer is equal to or less than the first buffer threshold value or when the remaining buffer amount of the buffer is equal to or greater than the second buffer threshold value, the IAB node 300-T stops the local rerouting and transmits the data to the original route. The buffer threshold value for stopping the local rerouting may be a threshold value different from the first buffer threshold value and/or the second buffer threshold value. That is, a third buffer threshold value is a buffer threshold value used for stopping the local rerouting when the buffer amount is equal to or less than the buffer threshold value. The third buffer threshold value is a buffer threshold value used for stopping the local rerouting when the remaining buffer amount ("available buffer size") is equal to or greater than the buffer threshold value. The third buffer threshold value may be at least one selected from the group consisting of a threshold value for each routing ID, a threshold value for each egress backhaul link, and a threshold value for each egress backhaul RLC channel.

Although the operation of triggering the local rerouting based on the amount of upstream data has been described in the first embodiment, the local rerouting may be triggered based on the amount of downstream data. In the case of the amount of downstream data, the local rerouting can be triggered using the first buffer threshold value and/or the second buffer threshold value, and the local rerouting can be stopped using the third buffer threshold value, in a manner same as, and/or similar to the case of the amount of upstream data.

Second Embodiment

A second embodiment is described.

In the second embodiment, the donor node 200 configures a remaining buffer amount threshold value used for triggering local rerouting. The remaining buffer amount threshold value is at least one selected from the group consisting of a threshold value for each routing ID, a threshold value for each egress backhaul link, a threshold value for each egress backhaul RLC channel, a threshold value for each upstream, and a threshold value for each downstream.

Specifically, the donor node (for example, the donor node 200) first configures the remaining buffer amount threshold value in the relay node (for example, the IAB node 300-T). Secondly, the relay node receives DL flow control feedback or UL flow control feedback. Thirdly, the relay node triggers local rerouting when the available buffer size included in the DL flow control feedback or the UL flow control feedback is equal to or less than the remaining buffer amount threshold value. Fourthly, the relay node transmits data to another relay node on an alternative path. Here, the remaining buffer amount threshold value is at least one selected from the group consisting of a remaining buffer amount threshold value for each routing ID, a remaining buffer amount threshold value for each egress backhaul link, a remaining buffer amount threshold value for each egress backhaul RLC channel, a remaining buffer amount threshold value in the upstream direction, and a remaining buffer amount threshold value in the downstream direction.

Accordingly, for example, the donor node 200 appropriately configures the remaining buffer amount in the IAB node 300-T. The IAB node 300-T can appropriately perform UL flow control feedback or DL flow control feedback.

Note that the remaining buffer amount threshold value is a threshold value that focuses on the remaining amount (or the free space) of the buffer that stores data waiting to be transmitted in the IAB node 300-T. The remaining buffer amount threshold value corresponds to, for example, the second buffer threshold value of the first embodiment.

In the second embodiment, attention is focused on the "available buffer size". The "available buffer size" may be included not only in the DL flow control feedback but also in the UL flow control feedback.

As described above, the second embodiment is applicable not only to the UL flow control but also to the DL flow control.

Operation Example According to Second Embodiment

Figure 12:
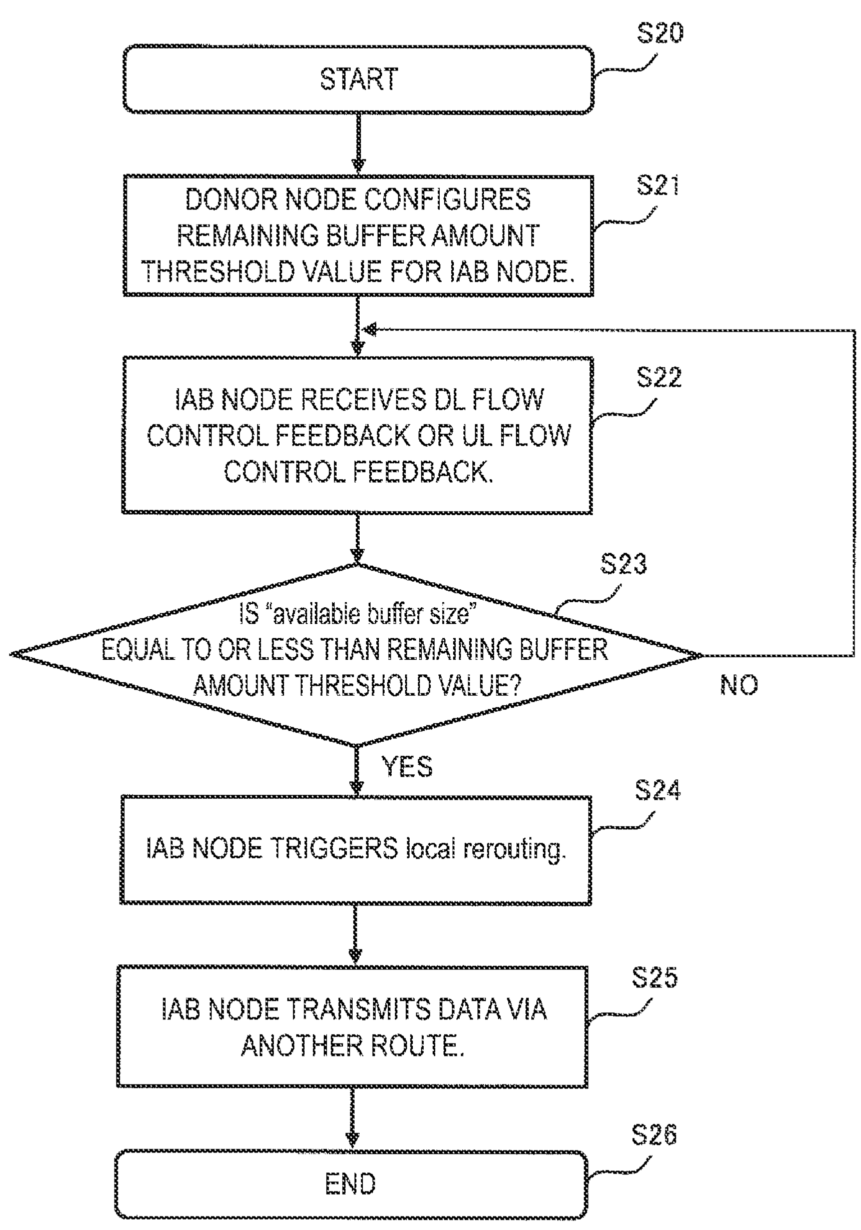
FIG. 12 is a diagram illustrating an operation example according to a second embodiment.
Figure 13A:
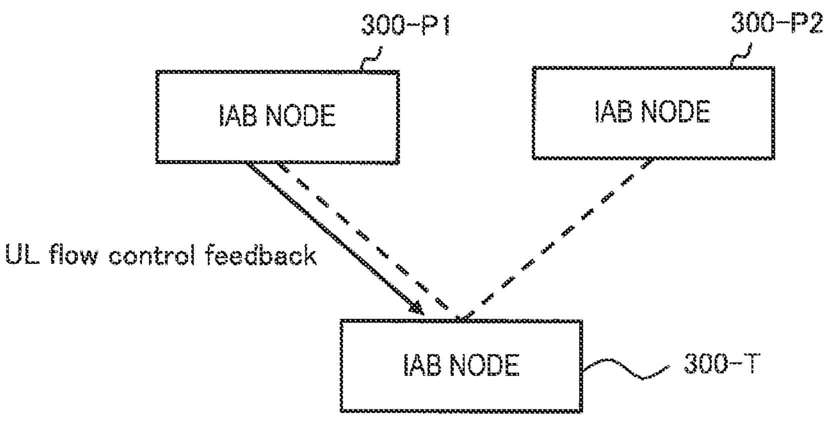
FIG. 13A and FIG. 13B are diagrams illustrating configuration examples between IAB nodes according to the second embodiment.
Figure 13B:
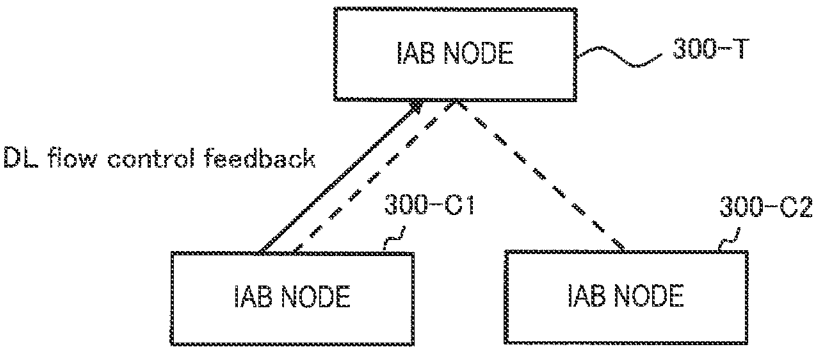

FIG. 12 is a flowchart illustrating an operation example according to the second embodiment. FIG. 13A and FIG. 13B are diagrams illustrating configuration examples between the IAB nodes according to the second embodiment. FIG. 12 will be described with reference to FIGS. 13A and 13B as appropriate.

As illustrated in FIG. 12, in Step S20, the IAB node 300-T starts processing.

In Step S21, the donor node 200 configures a remaining buffer amount threshold value in the IAB node 300-T. For example, the IAB node 300-T may receive an F1AP message or an RRC message including the remaining buffer amount threshold value from the donor node 200 and thus the remaining buffer amount threshold value may be configured in the IAB node 300-T.

The remaining buffer amount threshold value may be a remaining buffer amount threshold value for each routing ID. The remaining buffer amount threshold value may be a remaining buffer amount threshold value for each egress backhaul link. The remaining buffer amount threshold value may be a remaining buffer amount threshold value for each egress backhaul RLC channel. The remaining buffer amount threshold value may be a remaining buffer amount threshold value in the upstream direction. The remaining buffer amount threshold value may be a remaining buffer amount threshold value in the downstream direction. The remaining buffer amount threshold value may be at least one selected from the group consisting of a remaining buffer amount threshold value for each routing ID, a remaining buffer amount threshold value for each egress backhaul link, a remaining buffer amount threshold value for each egress backhaul RLC channel, a remaining buffer amount threshold value in the upstream direction, and a remaining buffer amount threshold value in the downstream direction. These values used as the remaining buffer amount threshold value may all be common or may be different values.

In Step S22, the IAB node 300-T receives UL flow control feedback or DL flow control feedback.

For example, as illustrated in FIG. 13A, the IAB node 300-T receives the UL flow control feedback from the parent node 300-P1. For example, as illustrated in FIG. 13B, the IAB node 300-T receives the DL flow control feedback from the child node 300-C1.

Hereinafter, a case where the IAB node 300-T receives the UL flow control feedback will be described, and then a case where the IAB node 300-T receives the DL flow control feedback will be described.

Returning to FIG. 12, in Step S23, the IAB node 300-T determines whether the available buffer size included in the UL flow control feedback is equal to or less than the remaining buffer amount threshold value.

When the available buffer size is equal to or less than the remaining buffer amount threshold value (YES in Step S23), the processing proceeds to Step S24. On the other hand, when the available buffer size is greater than the remaining buffer amount threshold value (NO in Step S23), the processing proceeds to Step S22 and the above-described processing is repeated.

In Step S24, the IAB node 300-T triggers local rerouting. For example, when the available buffer size of a routing ID #1 is equal to or less than the remaining buffer amount threshold value, the IAB node 300-T determines to perform the local rerouting of data corresponding to the routing ID #1.

In Step S25, when the local rerouting is possible, the IAB node 300-T transmits the data to another parent node 300-P2 on an alternative path. For example, in the example of FIG. 13A, the IAB node 300-T transmits the data to the parent node 300-P2.

Then, in Step S26, the IAB node 300-T ends the series of processing.

The case where the IAB node 300-T receives the DL flow control feedback is, for example, as follows.

That is, in Step S23, the IAB node 300-T determines whether the available buffer size included in the DL flow control feedback is equal to or less than the remaining buffer amount threshold value.

In Step S24, the IAB node 300-T triggers local rerouting. Then, in Step S25, when the local rerouting is possible, the IAB node 300-T transmits the data to another child node on an alternative path. In the example of FIG. 13B, the IAB node 300-T transmits the data to the child node 300-C2.

Variation of Second Embodiment

In the second embodiment, the processing of triggering the local rerouting when the available buffer size included in the flow control feedback is equal to or less than the threshold value has been described. The IAB node 300-T may determine to stop the local rerouting when the available buffer size included in the flow control feedback is equal to or greater than a threshold value. That is, the IAB node 300-T transmits data to the original route (child node 300-C1). The threshold value for triggering the local rerouting and the threshold value for stopping the local routing may be the same or may be different threshold values. The threshold value for stopping the local rerouting may be at least one selected from the group consisting of a threshold value for each routing ID, a threshold value for each egress backhaul link, a threshold value for each egress backhaul RLC channel, a threshold value in the upstream direction, and a threshold value in the downstream direction.

Third Embodiment

The 3GPP has studied how to perform rerouting in a network (or topology) formed by the plurality of IAB nodes 300.

Currently, scenarios for routing and rerouting are as follows.

(S1) Intra-CU/Intra-donor-DU
(S1-1) Routing
(S1-2) Rerouting
(S2) Intra-CU/Inter-donor-DU
(S2-1) Routing
(S2-2) Rerouting
(S3) Inter-CU
(S3-1) Routing
(S3-2) Rerouting In consideration of such scenarios, it is expected to improve the reliability, flexibility, and low latency of packet forwarding in a topology by studying a procedure or processing common to each scenario or by studying an individual procedure or processing of each scenario.

Note that the routing is, for example, to control to which IAB node 300 a received packet is forwarded.

Here, each scenario will be described focusing on the rerouting.

(S1) Regarding the "Intra-CU/Intra-Donor-DU" Scenario

Figures 14A, 14B, 14C:
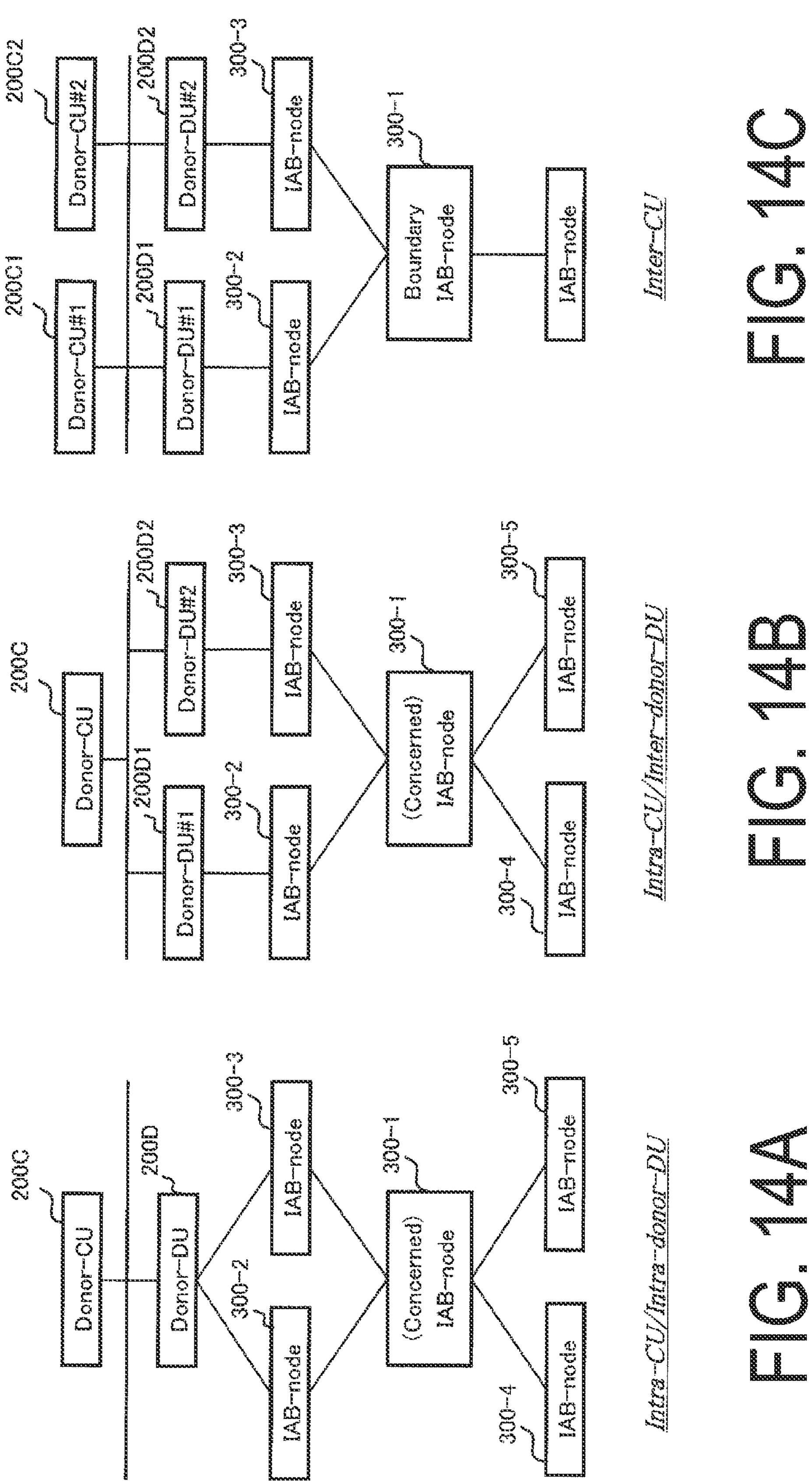
FIGS. 14A to 14C are diagrams illustrating configuration examples of a topology according to a third embodiment.

FIG. 14A illustrates a configuration example of a topology in the "Intra-CU/Intra-donor-DU" scenario.

The rerouting (S1-2) in this scenario is so-called local rerouting. For example, when detecting a radio link failure (BH RLF) in the backhaul link to the IAB node 300-2 (hereinafter, may be referred to as a "BH RLF"), the IAB node 300-1 can switch a path of a packet in the uplink direction to a path via the IAB node 300-3, which is an alternative path, and perform the rerouting.

(S2) Regarding "Intra-CU/Inter-Donor-DU" Scenario

FIG. 14B is a diagram illustrating a configuration example of a topology in the "Intra-CU/Inter-donor-DU" scenario.

Regarding rerouting in the IAB node 300-1, for example, a case will be considered in which a path via the IAB node 300-2 is switched to a path (alternative path) via the IAB node 300-3. In this case, a donor DU, which is a destination of the packet, is changed from a donor DU #1 (200D1) to a donor DU #2 (200D2). That is, the destination BAP address of the packet is changed. Thus, the 3GPP has agreed to rewrite the BAP header in this scenario. The rewriting of the BAP header is to rewrite a previous routing ID of the BAP header to a new routing ID. Note that the routing ID includes a destination BAP address (Destination) and a path identifier (Path ID).

(S3) Regarding the "Inter-CU" Scenario

FIG. 14C is a diagram illustrating a configuration example of a topology in the "Inter-CU" scenario.

As illustrated in FIG. 14C, in this scenario, two different CUs of a donor CU #1 (200C1) and a donor CU #2 (200C2) are provided. The donor DU #1 (200D1) is connected to the donor CU #1 (200C1), and the donor DU #2 (200D2) is connected to the donor CU #2 (200C2).

In general, different donor CUs form different topologies. That is, a topology (first topology) formed in a path from the donor CU #1 (200C1) to the IAB node 300-1 and a topology (second topology) formed in a path from the donor CU #2 (200C2) to the IAB node 300-1 may be different from each other. The IAB node 300-1 is located at the boundary of the two different topologies. Such an IAB node 300-1 located at the boundary may be referred to as a boundary IAB node (boundary node).

Regarding rerouting in this scenario, for example, the boundary IAB node 300-1 can forward a packet destined for the donor DU #1 (200D1) via the alternative path on the topology of the donor CU #2 (200C2).

However, the 3GPP has agreed that the rerouting in this scenario may be applied to the donor CU #2 (200C2), which is a target donor node, in the RRC reestablishment state while F1 connection with the donor CU #1 (200C1), which is a source donor node, is maintained in the boundary IAB node 300-1.

Communication Control Method According to Third Embodiment

The operation example, the processing, and the like described in the first embodiment can be applied to the scenario (S1-2), the scenario (S2-2), and the scenario (S3-2).

A case where the first embodiment is applied to the scenario (S2-2) is, for example, as follows. That is, as illustrated in FIG. 14B, it is assumed that, in the IAB node 300-1, the buffer amount of the buffer that stores data to be transmitted to the IAB node 300-2 is equal to or greater than the first buffer threshold value configured by the donor CU (200C). In this case, when rerouting to the IAB node 300-3 is possible, the IAB node 300-1 can transmit the data to the IAB node 300-3.

A case where the first embodiment is applied to the scenario (S2-3) is, for example, as follows. That is, as illustrated in FIG. 14C, it is assumed that, in the IAB node 300-1, the buffer amount of the buffer that stores data to be transmitted to the IAB node 300-2 is equal to or greater than the first buffer threshold value configured by the donor CU #1 (200C1). In this case, when rerouting to the IAB node 300-3 is possible, the IAB node 300-1 can transmit the data to the IAB node 300-3.

On the other hand, the operation example, the processing, and the like described in the second embodiment can also be applied to the scenario (S1-2), the scenario (S2-2), and the scenario (S3-2).

A case where the second embodiment is applied to the scenario (S2-2) is, for example, as follows. That is, as illustrated in FIG. 14B, it is assumed that when the IAB node 300-1 receives UL flow control feedback from the IAB node 300-2, the available buffer size included in the feedback is equal to or less than the remaining buffer amount threshold value. In this case, when rerouting to the IAB node 300-3 is possible, the IAB node 300-1 can transmit data stored in the buffer to the IAB node 300-3.

For example, even in a case where the IAB node 300-1 receives DL flow control feedback from an IAB node 300-4, the IAB node 300-1 can transmit data to an IAB node 300-5 when the available buffer size is equal to or less than the remaining buffer amount threshold value.

A case where the second embodiment is applied to the scenario (S3-2) is, for example, as follows. That is, as illustrated in FIG. 14C, it is assumed that, in the IAB node 300-1, the available buffer size included in UL flow control feedback from the IAB node 300-2 is equal to or less than the remaining buffer amount threshold value. In this case, when rerouting to the IAB node 300-3 is possible, the IAB node 300-1 can transmit data stored in the buffer to the IAB node 300-3.

In this manner, the operation example and the like described in the first embodiment are applicable to each scenario related to rerouting. The operation example and the like described in the second embodiment are also applicable to each scenario related to rerouting.

OTHER EMBODIMENTS

In the embodiments, the processing of triggering the local rerouting and the processing of stopping the local routing based on the buffer amount or the remaining buffer amount of the IAB node 300 and the remaining buffer amount of the flow control feedback have been described. The IAB node 300 may report the triggering and stopping of the local rerouting to the donor node 200. The report may further include information indicating a cause of the triggering or stopping. The cause information may be the buffer amount and/or the remaining buffer amount of the IAB node 300, or the remaining buffer amount included in the flow control feedback received by the IAB node 300. The report may include information of a route in which the local rerouting is triggered or stopped. The route information may be a routing ID or a backhaul RLC channel ID. The IAB node 300 may immediately transmit the report to the donor node 200 upon triggering or stopping the local rerouting. Alternatively, the IAB node 300 may transmit the report at a later time. In the case of transmitting the report at a later time, the IAB node 300 may record (log) the triggering or stopping, the cause information, and the route information upon triggering or stopping the local rerouting. The IAB node 300 may also record (log) information about a time when the local rerouting is triggered or stopped. The IAB node 300 may transmit the record (log) to the donor node 200 as the report upon request from the donor node 200.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. The embodiments, operation examples, processing operations, steps, and the like described in the first to third embodiments can be combined with each other. Part or the whole of the above-described first to third embodiments can be appropriately combined as long as no inconsistencies are introduced.

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

The invention claimed is:

1. A communication control method used in a cellular communication system, the communication control method comprising:

receiving, by a relay node, from a donor node an F1AP message to configure a buffer size threshold value;

receiving, by the relay node, a DL flow control feedback from a child node of the relay node; and performing, by the relay node, local rerouting in response to an available buffer size included in the DL flow control feedback being equal to or less than the buffer size threshold value, wherein the buffer size threshold value is a threshold value common to all routing IDs configured for the relay node.

2. A cellular communication system comprising:

a donor node;

a relay node; and a child node of the relay node, wherein the relay node receives from a donor node an F1AP message to configure a buffer size threshold value, the relay node receives a DL flow control feedback from a child node of the relay node, the relay node performs local rerouting in response to an available buffer size included in the DL flow control feedback being equal to or less than the buffer size threshold value, and the buffer size threshold value is a threshold value common to all routing IDs configured for the relay node.

3. A relay node comprising a receiver circuitry and a processing circuitry operatively associated with the receiver circuitry and configured to execute process of:

receiving from a donor node an F1AP message to configure a buffer size threshold value;

receiving a DL flow control feedback from a child node of the relay node; and performing local rerouting in response to an available buffer size included in the DL flow control feedback being equal to or less than the buffer size threshold value, wherein the buffer size threshold value is a threshold value common to all routing IDs configured for the relay node.

4. A non-transitory computer-readable storage medium storing a program for causing a computer to execute processing comprising:

receiving from a donor node an F1AP message to configure a buffer size threshold value;

receiving a DL flow control feedback from a child node of the relay node; and performing local rerouting in response to an available buffer size included in the DL flow control feedback being equal to or less than the buffer size threshold value, wherein the buffer size threshold value is a threshold value common to all routing IDs configured for the relay node.

5. A chipset for a relay node in a cellular communication system, the chipset comprising;

receiving from a donor node an F1AP message to configure a buffer size threshold value;

receiving a DL flow control feedback from a child node of the relay node; and performing local rerouting in response to an available buffer size included in the DL flow control feedback being equal to or less than the buffer size threshold value, wherein the buffer size threshold value is a threshold value common to all routing IDs configured for the relay node.

* * * * *